Aug. 14, 1945.                J. R. WILKS                2,382,761
                       BRIDGE DECKING AND THE LIKE
                          Filed Feb. 12, 1942
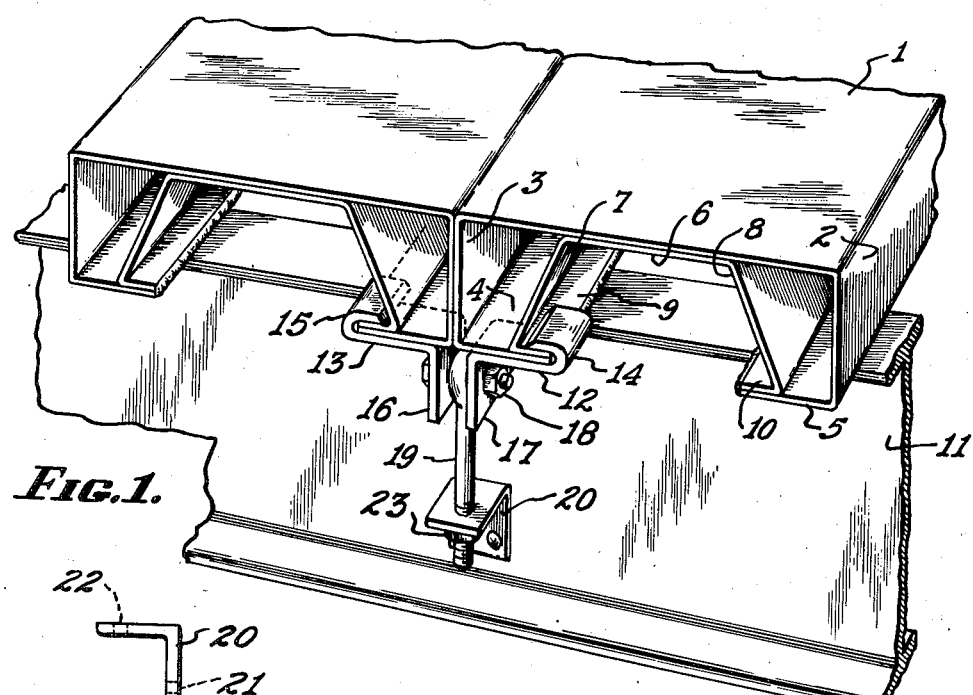
Fig.1.
Fig.2.
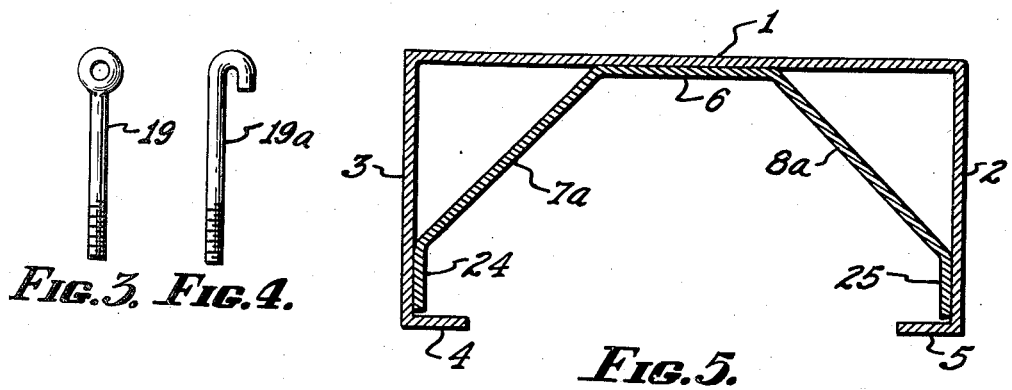
Fig.3.  Fig.4.  Fig.5.
INVENTOR.
JOHN R. WILKS.
BY Allen & Allen
ATTORNEYS.

Patented Aug. 14, 1945

2,382,761

UNITED STATES PATENT OFFICE 2,382,761

BRIDGE DECKING AND THE LIKE

John R. Wilks, Middletown, Ohio, assignor to The American Rolling Mill Company, Middletown, Ohio, a corporation of Ohio Application February 12, 1942, Serial No. 430,651

6 Claims. (Cl. 189—34)

In the copending application of Ray H. Gramm, Serial No. 380,519, filed February 23, 1941, there is set forth a bridge decking and deck unit of readily fabricatable character wherein by certain configurations the necessary strength is attained for the sustaining of both dead and live loads of great magnitude. The bridge decking is of simple construction, but exceedingly strong for the weight of metal involved. It is laid up across beams to which the decking units themselves are attached preferably by welding. This provides a very excellent structure and one which may be constructed at moderate cost where field conditions warrant. But there are circumstances where the welding together of structural units in the field is impracticable because the necessary welding apparatus, power for welding where electrical welding is attempted, or gas for welding where welding is done with a flame, cannot conveniently be transported to the job. Also there are certain types of construction in which welding is impracticable because the construction is such that the parts which should be welded together are not readily accessible in the structure. Where a deck of no greater width than the length of the individual decking units is laid on a pair of beams located respectively at or near the ends of the decking units, it is a comparatively simple matter to join the structures by welding so long as welding apparatus is available. But in more complicated and larger structures, where decking units are of such length or character that they must be supported by intermediate beams, or where the deck supporting structure is of complicated shape requiring angularly disposed bracing beams and the like, and where it is desired that these intermediate beams be attached to the decking units to prevent noise and rattle as vehicles cross the bridge, it becomes difficult to do the entire job by welding. Also, as will be clear, there are many jobs on which welding is impossible or commercially impracticable because the required means is not available.

It is an object of my invention to provide a structure of a decking unit such that it may be as readily fabricated as the decking units, for example, of the copending application of Gramm referred to, and at no greater cost. It is an object of my invention to provide a decking unit which will have weight for weight the same structural rigidity and the same capability of handling dead and live loads. But it is an object of my invention at the same time to provide a decking unit of such character that it may be attached to supporting structures by means other than welding, and in particular by boltlike devices which may be attached in the field and which require no further apparatus than a suitable wrench or equivalent means. It is an object of my invention to provide a structure in which are combined decking units, supporting members and detachable fastening means. It is an object of my invention to provide a fastening means and a mode of engagement of the fastening means with the decking units, the decking units being so configured as to accept the fastening means without sacrifice of strength and rigidity and without complication either of fabrication or of structure. It is again an object of my invention to provide a decking unit adapted to be attached at any point to a supporting structure without alteration of the structure of the decking unit, and a type of fastening means which can be used to attach a decking unit to a supporting structure at any point in the length of the decking unit.

These and other objects of my invention which will be set forth hereinafter or will be apparent to one skilled in the art upon reading these specifications, I accomplish by that certain structure and arrangement of parts of which I shall now describe exemplary embodiments. Reference is had to the accompanying drawing wherein:

Figure 1 is a partial elevational view of an assembly of supporting structure and decking units together with my fastening means.

Figure 2 is a side elevational view of a bracket structure.

Figures 3 and 4 are plan views of bolt means which I may employ.

Figure 5 is a cross sectional view of still another type of decking unit made in accordance with my invention.

Considering first the decking unit shown in Figure 1, it will be noted that I have taken sheet or plate metal and have bent it to form a top 1, side members 2 and 3, and bottom members 4 and 5 of a beamlike decking unit. A second piece of plate metal is bent to form a central portion 6 lying inwardly of the top section and against the base 1 thereof. Slantwise portions 7 and 8 extend divergently downwardly from the portion 6 and come against the feet 4 and 5 on the inside at lines spaced from the edges thereof. As at 9 and 10 portions of the slantwise depending members 7 and 8 may be bent over horizontally to conform to the foot portions 4 and 5 of the outer part of the decking unit. The edges of the parts 9 and 10 are preferably made coterminous with the edges of the foot portions 4 and 5, to which they may be attached by welding. In order to prevent both rattle and displacement, I prefer to perforate the section 6 of the inner member at intervals and, in the fabricating plant, attach it at these intervals to the base 1 of the outer portion by what are known in the art as plug welds, i. e., by welding the edges of the perforations in the member 6 to the base 1. It will be understood, of course, that the base 1 may itself be perforated and welded by plug welds to an imperforate portion 6 of the inner member. The base member of the decking unit may be perforated, embossed, or otherwise provided with non-skid means as may be deemed desirable.

I have shown a decking unit preferably made of two pieces of plate metal. It will be understood that the same structure may, with somewhat less convenience and somewhat greater expense, be made of more than two pieces, with the parts welded together as may be required.

Such decking units may be assembled side by side with their foot portions resting upon suitable supporting means. In Figure 1, one of these means is shown as an I-beam 11. The decking units may be attached both to each other and to the supporting structure by means which will now be described. I provide a pair of oppositely disposed engagement means 12, 13. Each of these means has on one end a hook-shaped portion 14 or 15 for engaging the combined parts 9 and 4 or 10 and 5 of the foot portions of the decking unit. At the other end the means 12, 13 have angularly related ears 16, 17 perforated to accept a bolt 18 by which they are connected together and to an eye or hook bolt 19. This bolt in turn engages a bracket 20 of angular conformation having a portion 21 attached to the I-beam 11 as by rivets or the like, and a portion 22 which is perforated to receive the threaded leg of the eye or hook bolt 19. One or more nuts 23 fasten the eye or hook bolt to the bracket 20 and permit the exerting of downward pressure on the foot portions of the decking units.

It will be noted that the construction of my attaching means is such that they operate both to force the side by side decking units against each other and to attach these units to the supporting structure such as the I-beam 11. From the construction of the decking units themselves it will be seen that my attachment means may be engaged with a pair of decking units at any point along their length and so far as the preparation of a supporting structure to receive my attachment means is concerned, there is required only the attachment of bracket means such as 20. This may, if desired, be done in the field. In some instances the use of bracket means may be dispensed with, as for example, where one of the webs of an I-beam, angle beam, T-beam or the like is perforated to receive the eye or hook bolt 19 or 19a.

Another form of decking unit is shown in Figure 5 where the outer portion is the same as to its parts and has been given like index numerals. The inner member is again the same or similar as to portion 6, but the slantwise disposed portions 7a and 8a contact the side members 2 and 3 at lines somewhat interspaced from the lines of juncture of the side portions and the foot or bottom portions. The members 7a and 8a have downward extensions 24 and 25 which lie along the side portions 2 and 3 of the outer member and to which they are attached, preferably by welding.

There may be noted as advantages inherent in this structure that the decking units are easily made by relatively simple forming operations. My structures, further, are such that instead of being welded by flame or electric arc, they may be welded by spot or line welding apparatus where the gauge of the metal will permit. This is because in my units all superposed parts which must be attached together are available for contact by oppositely disposed pressure electrodes. It will be understood, of course, that other fastening means, such as rivets or the like, may be employed where desired.

Modifications may be made in my invention without departing from the spirit of it. Having thus described my invention, what I claim as new and desire to secure by Letters Patent is:

1. A bridge decking member of elongated form consisting of two telescoping pieces of substantially the same length, an outer piece of generally channel shape comprising a top, side members depending from the top, and relatively narrow foot members extending toward each other from the lower edges of said side members, and an inner piece comprising a longitudinal portion narrower than said top, adapted to lie beneath it and in conformity therewith, and being fastened thereto, side portions extending diagonally downwardly and outwardly from said first mentioned portions and meeting parts of said outer member other than the said top along lines spaced from the inner edges of said foot members, and further longitudinal portions forming extensions of said diagonal portions and paralleling the portions of the outer member so met thereby, and fastened thereto.

2. The structure of claim 1 in which said diagonally extending portions engage said side members at lines spaced from said foot members, and said further longitudinal portions lie along said side members and are fastened thereto.

3. In a bridge structure, supporting means, a pair of the bridge decking members of claim 1 resting thereon in side-by-side relationship, hook means engaging adjacent foot members of said decking members, means to draw said hook members together, and depending means engaging said last mentioned means and having engagement with said supporting means.

4. In combination, supporting means and beam-like decking members as claimed in claim 1 resting on said supporting means in side-by-side relationship, said decking members having inturned feet on their lower sides, and fastening means comprising opposed hook members engaging feet of adjacent decking members, bolt means for drawing said hook members together, bolt means engaging said first mentioned bolt means, and a bracket on said supporting means, said last mentioned bolt means engaging said bracket means.

5. A bridge decking member of elongated form comprising a top, uniplanar side members depending from the top, foot members extending toward each other from the lower ends of said side members, and a bracing structure of elongated form and comprising a portion lying beneath and attached to said top, depending, diagonally outwardly arranged bracing portions, and angularly arranged attachment portions fastened to parts of said decking member remote from said top, in such manner as to permit engagement of holding means with said foot members, all of the parts of said decking member being of substantially the same length, the said diagonally outwardly arranged bracing portions engaging said foot members at lines spaced from the juncture of said side members and said foot members, the said attachment portions lying along said foot members and fastened thereto.

6. A bridge decking member consisting of two telescopic parts of substantially the same length, an outer part of channel form having a top, depending sides, and inturned foot portions, and an inner part having a portion to lie beneath said top and in conformity therewith, said portion being attached to said top and of substantially less width than said top, diagonally downwardly and outwardly extending portions extending to meet portions of the outer member along lines remote from said top, and further portions at the downward edges of said diagonal portions paralleling the portions of the outer member so met and attached thereto, said last mentioned portions of the inner member including portions lying along and paralleling the said foot portions of the said outer member.

JOHN R. WILKS.